May 3, 1949.  W. E. HOLT ET AL  2,468,929
DRIVE UNIT FOR FLOOR TREATING MACHINES
Filed Feb. 28, 1946  3 Sheets-Sheet 1

INVENTORS
William E. Holt &
William R. Holt
BY
ATTORNEY

May 3, 1949.   W. E. HOLT ET AL   2,468,929
DRIVE UNIT FOR FLOOR TREATING MACHINES
Filed Feb. 28, 1946   3 Sheets-Sheet 2

INVENTORS
William E. Holt &
William R. Holt
BY
ATTORNEY

INVENTORS
William E. Holt &
William R. Holt
BY
ATTORNEY

Patented May 3, 1949

2,468,929

UNITED STATES PATENT OFFICE 2,468,929

DRIVE UNIT FOR FLOOR TREATING MACHINES

William E. Holt and William R. Holt, Oakland, Calif.

Application February 28, 1946, Serial No. 650,874

10 Claims. (Cl. 74—421)

1

This invention relates in general to the construction and operation of portable surface treating machines, and more particularly, to the construction and operation of speed reduction drive units adapted for use in such machines.

Machines of this type, such as floor maintenance machines for brushing, polishing and the like, usually include a rotary surface treating element rotatable about a vertical axis and operatively connected to a manually controlled electric motor by a speed reduction drive unit therebetween. To prevent contact of dust, water, etc. with the drive parts, as well as to afford continuous lubrication of the moving parts, the drive parts are usually enclosed in a rotatable housing constructed to contain a body of lubricant in which the moving parts are immersed.

The main object of this invention is to provide an improved construction of a speed reduction drive unit for surface treating machines of the character described which is of simple and durable construction, easy to assemble and disassemble, and comprises relatively few parts. A further and more specific object is the provision of a drive unit housing of the character described having a one-piece integral construction, eliminating any joints or openings which would permit the leaking of lubricant therethrough onto the surface treating element or surface being treated. A further specific object is the provision of a rotatable drive unit housing having an improved rotary supporting connection with the associated stationary parts of the drive unit. A still further specific object is the provision of a drive unit of the character described having an improved construction and mounting of the gear elements incorporated therein.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which a preferred embodiment of the invention is illustrated and described.

Of the drawings:

Figs. 3 and 4 are horizontal sections through

Figure 2:
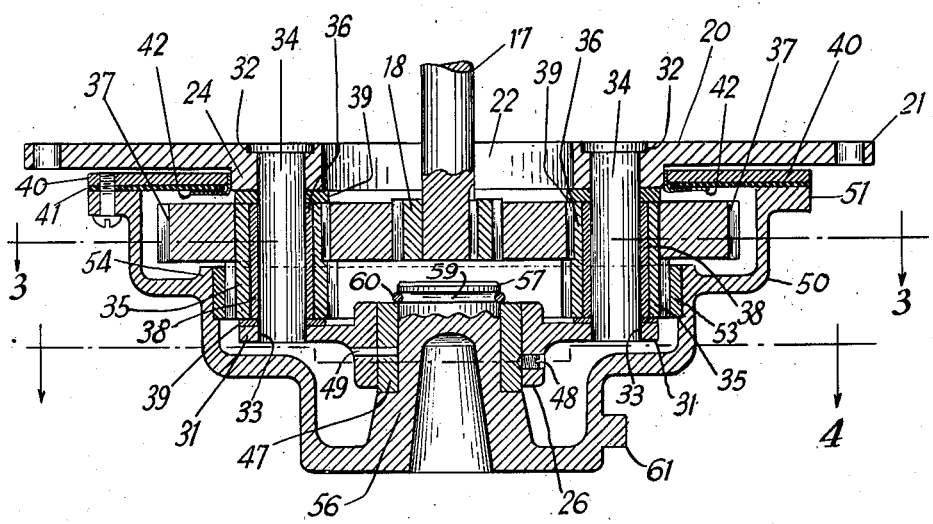
Fig. 2 is an enlarged sectional elevation of the drive unit of the invention.
Figure 5:
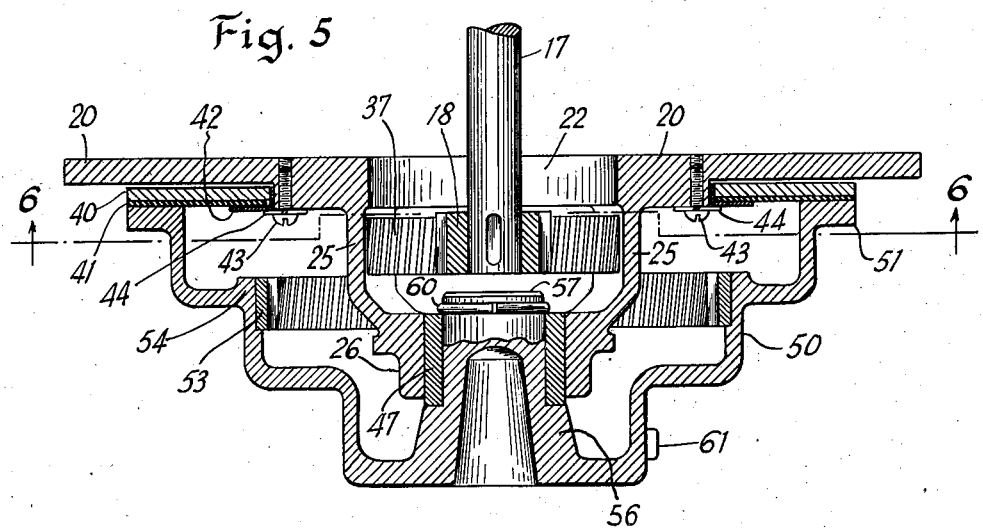
Figure 6:
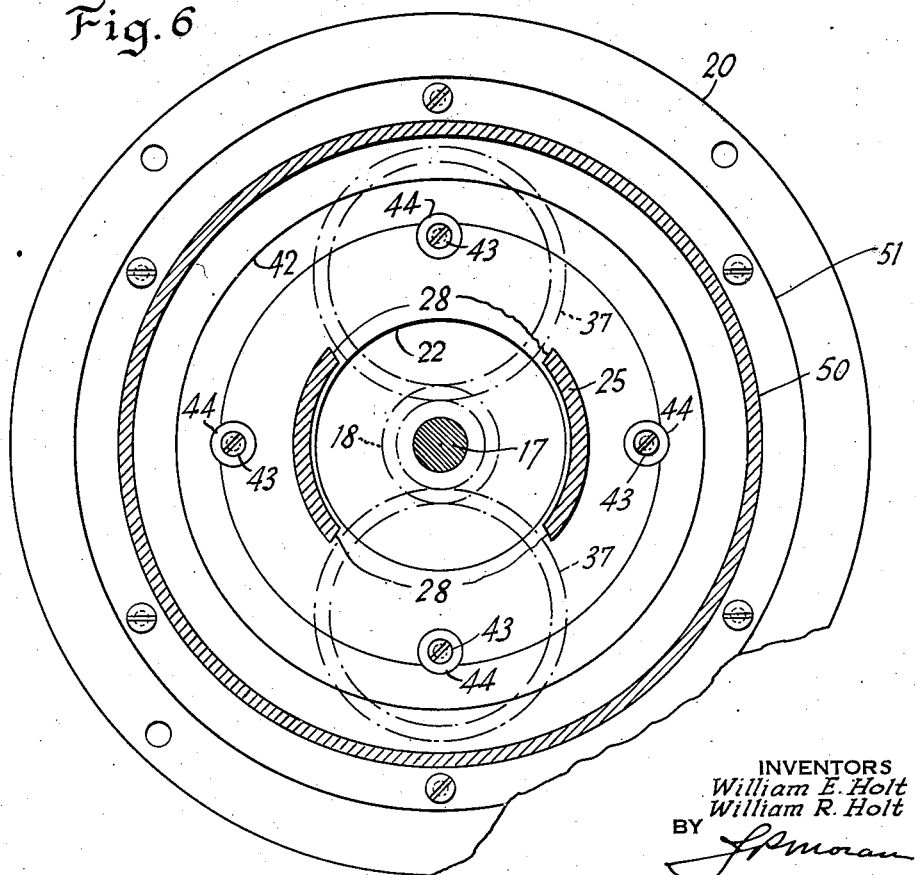

2 the drive unit taken on the lines 3—3 and 4—4 respectively of Fig. 2;

Fig. 5 is a view similar to Fig. 2 taken at right angles thereto;

Fig. 6 is a horizontal section taken on the line 6—6 of Fig. 5; and

Figure 7:
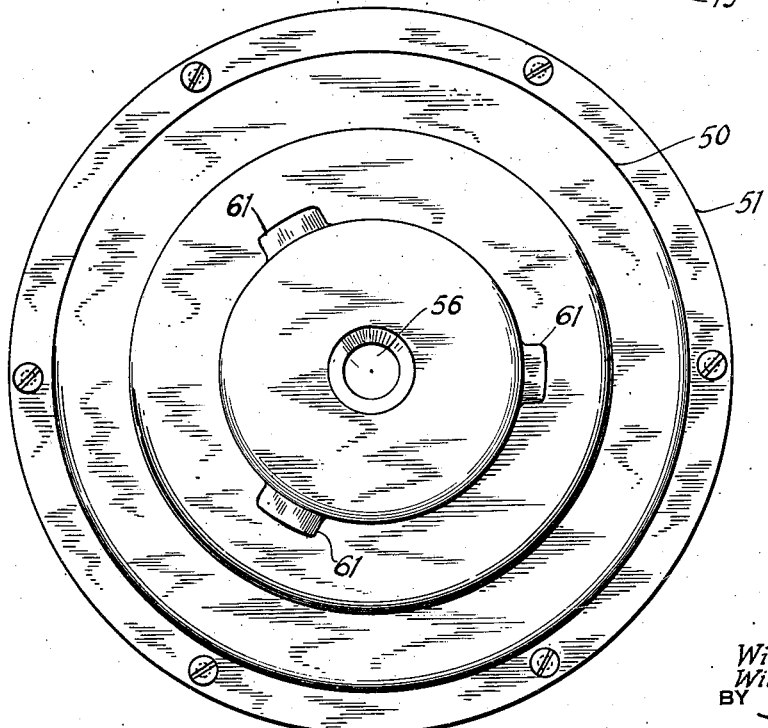
Figure 3:
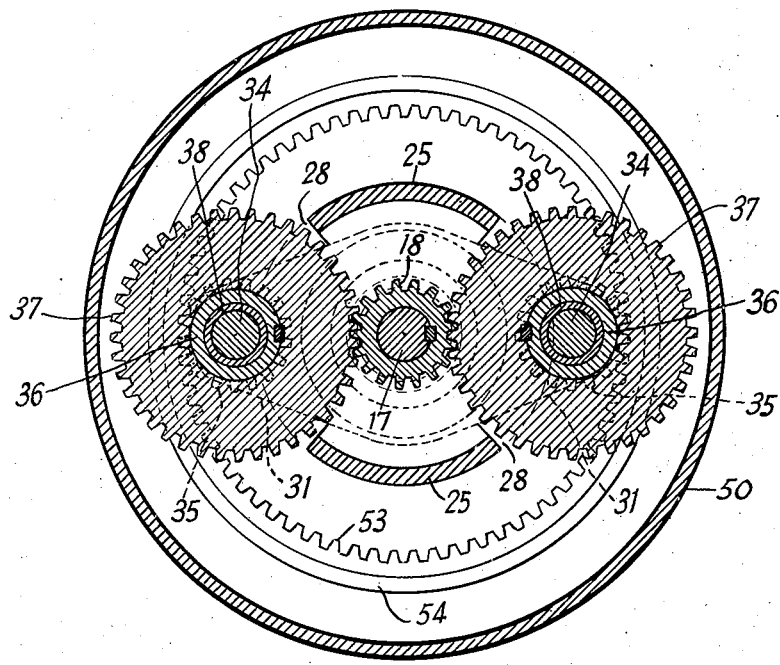

Fig. 7 is a bottom view of the drive unit housing.

Figure 4:
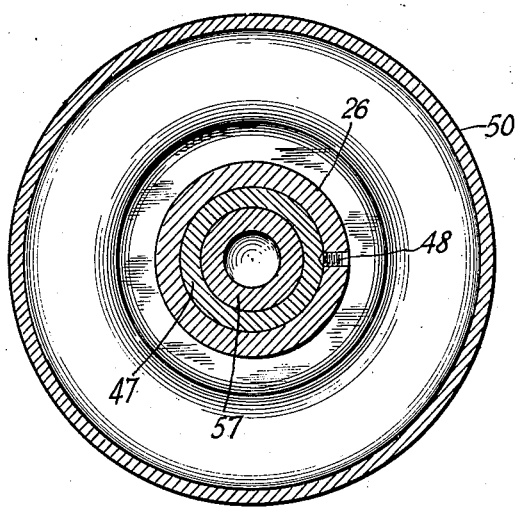
Figure 1:
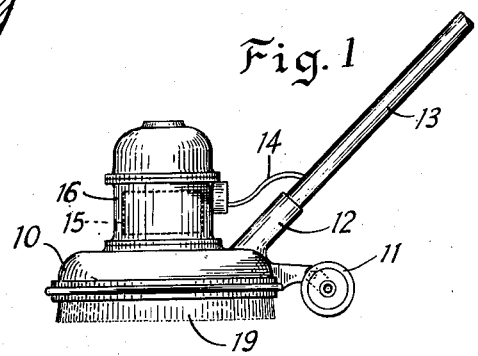
Fig. 1 is a partly diagrammatic elevation of a portion of a portable floor maintenance machine adapted to be constructed in accordance with the invention.

In the floor maintenance machine illustrated in Fig. 1, a wheeled carriage is formed by an annular downwardly flaring casing 10, on the rear side of which a pair of supporting wheels 11 are tiltably mounted. A socket 12 on the casing receives a hollow handle member 13 by which the machine is directed by the operator. The handle 13 serves as a conduit for electrical connections 14 to an electric motor 15 in a housing 16 mounted on the casing 10. The motor 15 is arranged with its drive shaft 17 vertical and symmetrically projecting downwardly through the central opening in the casing 10. A helical pinion gear 18 is keyed on the lower end of the shaft 17 and is operatively connected through a speed reducing drive unit within the casing 10 to a rotary surface treating element, shown for example, as a brush 19, as hereinafter described.

In accordance with this invention, the speed reduction drive unit comprises a stationary gear supporting member 20 having an annular top plate 21 detachably secured to the casing 10 and/or motor housing 16. The drive shaft 17 and pinion gear 18 project downwardly through and concentrically with the center opening 22 in the top plate. The top plate has a short annular thickened section or shoulder 24 surrounding the opening 22 and a pair of integral depending segmental arms 25 which curve inwardly at their lower ends and merge into a short integral tubular sleeve bearing support member 26 having an inside diameter substantially less than the plate opening 22. The arms 25 are diametrically opposed, leaving a pair of segmental openings 28 therebetween. A pair of flat integral tapering plates 31 extend horizontally intermediate the height of the bearing support member 26 at diametrically opposite locations below the openings 28. The described gear supporting member 20 is advantageously constructed in a single casting.

A pair of countersunk holes 32 are drilled in the top plate 21 at diametrically opposite points adjacent the periphery of the center opening 22 and so as to register with a pair of holes 33 drilled in the plates 31. A short headed stationary shaft 34 is positioned in each pair of holes 32, 33 and a double idler gear unit rotatably mounted thereon.

Each idler gear unit consists of a lower helical gear 35 having an upper tubular extension 36 on which an oppositely pitched helical gear 37 of larger diameter is keyed. A sleeve bearing 38 is press fitted into the gear 35 and extension 36 and rotatably contacts with the shaft 34. Bronze washers 39 are arranged on the shaft 34 between the ends of the gear 35 and extension 36 and the corresponding plate 31 and top plate 21 respectively. With the described construction portions of the pair of upper helical gears 37 extend through the openings 28 to mesh with the pinion gear 18 at diametrically opposite points.

An annular cover plate 40 is positioned below the top plate 21 outside the plate shoulder 24 and rotatably sealed in that position by a fiber washer 41 and an annular grease guard 42 overlapping the lower side of the washer 41. The guard 42 is held in position relative to the top plate by spaced cap screws 43 on the underside of the plate shoulder 24 and lock washers 44 thereon.

A bronze sleeve bearing 47 is positioned in the sleeve bearing support member 26 and arranged therein with its lower end projecting slightly below the bottom of the support member and its upper end at the level of or slightly below the top of the support member. The sleeve bearing is press fitted into the support member and secured in that position by a set screw 48. Openings 49 extending through the sleeve bearing and support member permit the entrance of lubricant to the inner surface of the bearing.

The described parts are substantially enclosed by a housing 50 formed by a one-piece bowl-shaped downwardly stepped casting of circular cross-section adapted to contain a body of lubricant, such as grease or lubricating oil. A peripheral flange 51 on the upper edge of the housing is detachably connected to the underside of the cover plate 40. A bronze helical ring gear 53 is press fitted into the intermediate section 54 of the housing and when the parts are assembled meshes with the lower helical idler gears 35 at diametrically opposite points. The bottom section of the housing is advantageously devoid of openings, eliminating any possibility of lubricant leakage or entrance of foreign matter therethrough. The housing bottom is formed with a central upwardly extending integral hollow stem 56 having an upper shaft section 57 of reduced cross-section adapted to project upwardly through the sleeve bearing 47 and to be rotatably mounted therein. The shaft section 57 is proportioned so that when the parts are assembled, the enlarged portion of the stem will abut the lower end of the sleeve bearing 47 and the upper end of the shaft section will project above the upper end of the bearing. An annular groove 59 is formed in the shaft section just above the upper level of the sleeve bearing and the housing is held in its assembled position by a split ring 60 resiliently held in the groove 59 and overlapping and in contact with the upper end of the sleeve bearing. The split ring thus forms the sole support of the rotatable housing 50 on the stationary gear supporting member 20. Angularly spaced external lugs 61 on the lower section of the housing are adapted to detachably support the surface treating element 19 by bayonet type joints in a well known manner.

The described parts may be easily and quickly assembled. The gear supporting member 20 and associated parts are assembled as a unit and the housing 50 then added to the assembly by inserting the shaft section 57 through the sleeve bearing and snapping the split ring 60 in position in the groove 59, the ring gear 53 meshing with the lower idler gears 35. The housing flange 51 is connected to the cover plate 40 and the housing substantially filled with a body of lubricant. The assembly is then connected through the top plate 21 to the motor housing 16 and/or casing 10, with the pinion gear 18 meshing with the idler gears 37. With the mounting of a rotary surface treating element 19 on the housing, the machine will be ready for operation.

The leakproof construction of the housing 50 is especially advantageous in a machine of the character described and in conjunction with the cover plate-gasket assembly minimizes the entrance of foreign matter into the housing. The use of self-lubricating sleeve bearings for the gear and housing mountings minimizes the number of parts and simplifies the manufacture and assembly of the drive unit. The described connection between the rotatable housing and the stationary gear supporting member provides a simple yet highly effective assembly and operation of these parts.

While in accordance with the provisions of the statutes we have illustrated and described herein the best form of the invention now known to us, those skilled in the art will understand that changes may be made in the form of the apparatus disclosed without departing from the spirit of the invention covered by our claims, and that certain features of our invention may sometimes be used to advantage without a corresponding use of other features.

We claim:

1. A surface treating machine comprising a drive unit including a motor having a vertical drive shaft, a pinion gear mounted on said drive shaft, a stationary gear supporting member having a circular bearing support member, a bearing secured in said bearing support member, an idler gear operatively connected to said pinion gear, a one-piece bowl-shaped casting forming a lubricant-containing housing surrounding said gears and having a ring gear thereon meshing with said idler gear, said housing having an integral closed bottom section and a central stem projecting upwardly therefrom into said bearing, and means for rotatably supporting said stem in said bearing.

2. A surface treating machine comprising a drive unit including a motor having a vertical drive shaft, a pinion gear mounted on said drive shaft, a stationary gear supporting member having a circular sleeve bearing support member, a sleeve bearing secured in said bearing support member, an idler gear operatively connected to said pinion gear, a one-piece bowl-shaped casting forming a lubricant-containing housing surrounding said gears and having a ring gear thereon meshing with said idler gear, said housing having an integral closed bottom section and a central stem projecting upwardly therefrom through said sleeve bearing, a circular groove in the portion of said stem projecting above said sleeve bearing, and a split ring in said groove arranged to rotatably support said stem on said sleeve bearing.

3. A surface treating machine comprising a drive unit including a motor having a vertical drive shaft, a pinion gear mounted on said drive shaft, a stationary gear supporting member having an annular top plate concentric with said shaft, a circular sleeve bearing support member integrally supported from and below said top plate, a sleeve bearing secured in said bearing support member, an idler shaft extending downwardly from said annular plate, an idler gear mounted on said idler shaft and operatively connected to said pinion gear, a one-piece bowl-shaped casting forming a lubricant-containing housing surrounding said gears and having a ring gear thereon meshing with said idler gear, said housing having an integral closed bottom section and a central stem projecting upwardly therefrom into said sleeve bearing, and means for rotatably supporting said stem in said sleeve bearing.

4. A surface treating machine comprising a drive unit including a motor having a vertical drive shaft, a pinion gear mounted on said drive shaft, a stationary gear supporting member having an annular top plate concentric with said shaft, a circular sleeve bearing support member integrally supported from and below said top plate, a sleeve bearing secured in said bearing support member, an idler shaft extending downwardly from said annular plate, a helical idler gear mounted on said idler shaft and operatively connected to said pinion gear, a one-piece bowl-shaped casting forming a lubricant-containing housing surrounding said gears and having a helical ring gear thereon meshing with said idler gear, said housing having an integral closed bottom section and a central stem projecting upwardly therefrom through said sleeve bearing, a circular groove in the portion of said stem projecting above said sleeve bearing, and a split ring in said groove arranged to rotatably support said stem on said sleeve bearing.

5. A surface treating machine comprising a drive unit including a motor having a vertical drive shaft, a helical pinion gear mounted on said drive shaft, a stationary gear supporting member having an annular top plate concentric with said shaft, a circular sleeve bearing support member integrally supported from and below said top plate, a sleeve bearing secured in said bearing support member, an idler shaft extending downwardly from said annular plate, a helical idler gear mounted on said idler shaft and operatively connected to said pinion gear, a one-piece bowl-shaped casting forming a lubricant-containing housing surrounding said gears and having a helical ring gear thereon meshing with said idler gear, said housing having an integral closed bottom section and a central stem projecting upwardly therefrom through said sleeve bearing, said central stem having an enlarged portion abutting the lower end of said sleeve bearing, a circular groove in the portion of said stem projecting above said sleeve bearing, and a split ring in said groove arranged to rotatably support said stem on said sleeve bearing.

6. A drive unit adapted for use in surface treating machines comprising a stationary gear supporting member having an annular horizontally arranged top plate, a circular sleeve bearing support member supported from said top plate, a sleeve bearing secured in said bearing support member, an idler gear rotatably mounted in said gear supporting member, a one-piece bowl-shaped casting forming a housing adapted to contain a body of lubricant and concentric with said bearing support member, a ring gear on said housing arranged to mesh with said idler gear, said housing having an integral closed bottom section and a central stem projecting upwardly therefrom into said sleeve bearing, and means for rotatably supporting said stem in said sleeve bearing.

7. A drive unit adapted for use in surface treating machines comprising a stationary gear supporting member having an annular horizontally arranged top plate, a circular sleeve bearing support member concentric with and integrally supported from said top plate, a sleeve bearing secured in said bearing support member, an idler gear rotatably mounted in said gear supporting member, a one-piece bowl-shaped casting forming a housing adapted to contain a body of lubricant and concentric with said bearing support member, a ring gear on said housing arranged to mesh with said idler gear, said housing having an integral closed bottom section and a central stem projecting upwardly therefrom into said sleeve bearing, and means for rotatably supporting said stem in said sleeve bearing.

8. A drive unit adapted for use in surface treating machines comprising a stationary gear supporting member having an annular horizontally arranged top plate, a circular sleeve bearing support member concentric with and integrally supported from said top plate, a sleeve bearing secured in said bearing support member, a helical idler gear rotatably mounted in said gear supporting member, a one-piece bowl-shaped casting forming a housing adapted to contain a body of lubricant and concentric with said bearing support member, a separate helical ring gear having a press fit in said housing and arranged to mesh with said idler gear, said housing having an integral closed bottom section and a central stem projecting upwardly therefrom through said sleeve bearing, a circular groove in the portion of said stem projecting above said sleeve bearing and a split ring in said groove arranged to rotatably support said stem on said sleeve bearing.

9. A speed reduction drive unit adapted for use in a surface treating machine having a motor driven vertical drive shaft and a pinion gear mounted on said drive shaft, comprising an annular top plate concentric with said drive shaft and having an annular bearing support member depending therefrom, a vertical stub shaft positioned in and extending downwardly from said top plate, an idler gear mounted on said stub shaft and operatively connected to said pinion gear, a bearing horizontally positioned in said bearing support member, a one-piece bowl-shaped casting forming a rotatable lubricant-containing housing surrounding said gears and having an internal ring gear therein meshing with said idler gear, said housing having an annular integral bottom section and a central vertical shaft projecting upwardly from said bottom section through and above said bearing, a circular groove in the portion of said shaft extending above said bearing, and a split spring ring in said groove supported on the upper end of said bearing and arranged to serve as the sole load support for said rotatable housing.

10. A speed reduction drive unit adapted for use in a surface treating machine having a motor driven vertical drive shaft and a pinion gear mounted on said drive shaft, comprising an annular top plate concentric with said drive shaft and having an annular integral bearing support member depending therefrom, a stationary vertical stub shaft supported in and extending downwardly from said top plate, an idler gear rotatably mounted on said stub shaft and operatively connected to said pinion gear, a bearing horizontally positioned in said bearing support member, a one-piece bowl-shaped casting forming a rotatable lubricant-containing housing surrounding said gears and having an internal helical ring gear therein meshing with said idler gear, said housing having an annular integral bottom section and a central vertical shaft projecting upwardly from said bottom section through and above said bearing, a circular groove in the portion of said shaft extending above said bearing, and a split spring ring in said groove supported on the upper end of said bearing and arranged to serve as the sole load support for said rotatable housing.

WILLIAM E. HOLT.
WILLIAM R. HOLT.

REFERENCES CITED

The following references are of record in the file of this patent:

UNITED STATES PATENTS

| Number | Name | Date |
|---|---|---|
| 2,026,006 | Wennerstrom | Dec. 31, 1935 |
| 2,079,730 | Blair | May 11, 1937 |
| 2,108,368 | Christian | Feb. 15, 1938 |
| 2,221,315 | Okun | Nov. 12, 1940 |
| 2,337,501 | Schmidt | Dec. 21, 1943 |